B. D. Howe,

Horse-Muzzle.

Nº 66,840.          Patented July 16, 1867.

Witnesses
J. N. Chase
John S. Woodman

Inventor
Benjamin D. Howe

United States Patent Office.

BENJAMIN D. HOWE, OF HANOVER, NEW HAMPSHIRE.

Letters Patent No. 66,840, dated July 16, 1867.

---

IMPROVEMENT IN DEVICE FOR PREVENTING HORSES FROM BITING AND CRIB-BITING.

---

*The Schedule referred to in these Letters Patent and making part of the same.*

---

TO ALL WHOM IT MAY CONCERN:

Be it known that I, BENJAMIN D. HOWE, of Hanover, in the county of Grafton, and State of New Hampshire, have invented a new and useful device for preventing and correcting or curing the habit or disease in horses called "Cribbing," and also correcting the habit of biting; and I do hereby declare that the following is a full, clear, and exact description of the same, reference being had to the accompanying drawings, making a part of this specification, in which—

Figure 1:
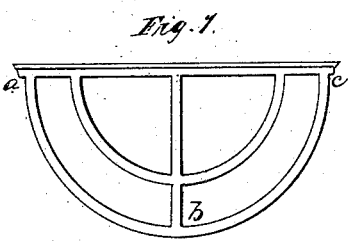
Figure 2:
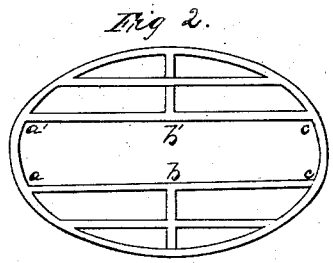
Figure 3:
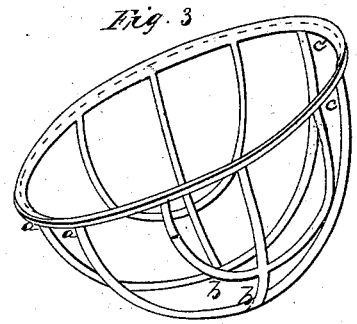

Figure 1 is an elevation.
Figure 2 is a plan view.
Figure 3 is a perspective view.

The nature of my invention consists in a secure basket-shaped muzzle of iron, or other suitable material, to be worn constantly by the horse until the habit or disease of "cribbing" and biting is corrected.

A band or ring, of suitable size and shape, to fit as intended around the lower part of the horse's head, immediately above the nose and mouth, has connected therewith, as shown in the drawings, curved bands or strips, arranged to cover the mouth of the horse sufficiently to prevent cribbing or biting, and yet allowing the horse to feed conveniently, an opening between the bands, as shown at $a\ a'\ b\ b',\ c\ c'$, in the drawing, being provided for that purpose, which, though large enough to admit such substances as constitute the food of a horse, is too small to allow him to take hold with his teeth of such articles as he would otherwise do, were he allowed to "crib" or bite.

Figure 4:
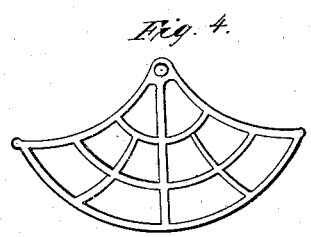
Figure 5:
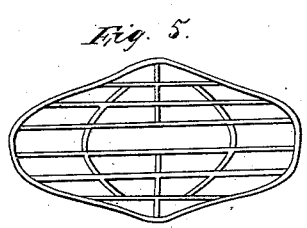
Figure 6:
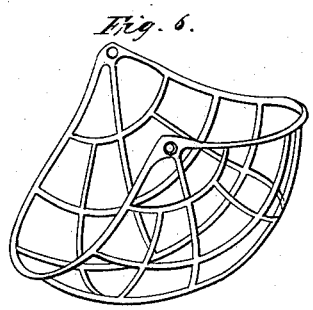

As the foregoing described muzzle is more suitable to be worn while the horse is in the stall or stable, and as to cure the habit or disease it is necessary that the horse should be constantly muzzled both within the stable and without, I have shown in the drawings a different modification of the same principle (Figures 4, 5, and 6,) to be attached to the bridle-bit. The ring which in the first principle would pass around the lower part of the horse's head, is in the modification curved (as shown clearly in the drawings) from the points of attachment to the bridle-bit down nearly below the nose and mouth of the horse.

Having described my device, what I claim as my invention, and seek to secure by Letters Patent, is—

A muzzle of suitable material, constructed of bands of metal, with an opening $a\ a',\ b\ b',\ c\ c'$, used in the manner and for the purpose set forth.

BENJAMIN D. HOWE.

Witnesses:
J. N. CHASE,
JOHN S. WOODMAN.